Feb. 9, 1954 M. BERMAN 2,668,444
STRESS DETERMINING INSTRUMENT
Filed March 31, 1950 2 Sheets-Sheet 1

INVENTOR.
Morris Berman
BY
Harry Jacobson
ATTORNEY

Feb. 9, 1954 M. BERMAN 2,668,444
STRESS DETERMINING INSTRUMENT
Filed March 31, 1950 2 Sheets-Sheet 2
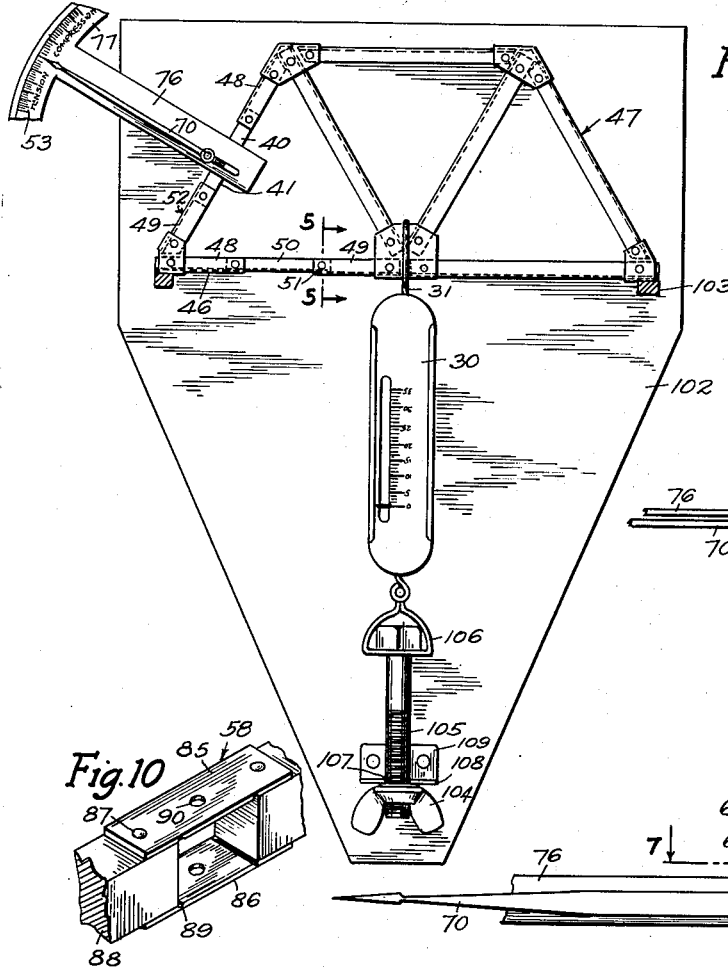
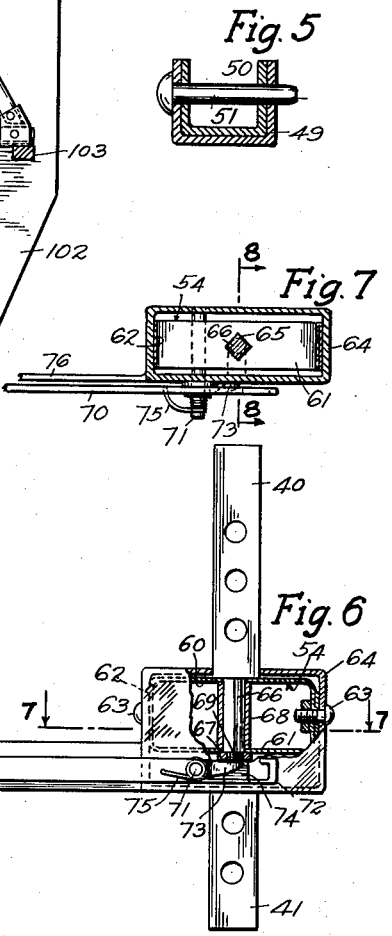
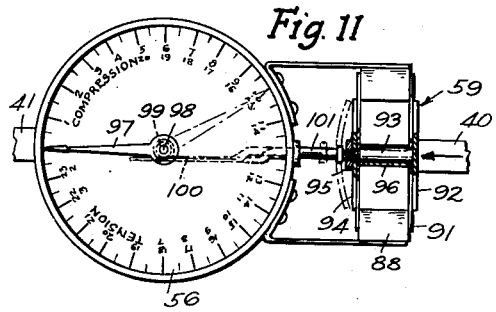
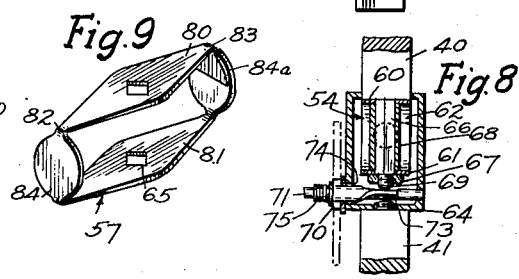
INVENTOR.
Morris Berman
BY Harry Jacobson
ATTORNEY Patented Feb. 9, 1954

2,668,444

UNITED STATES PATENT OFFICE 2,668,444

STRESS DETERMINING INSTRUMENT

Morris Berman, New York, N. Y.

Application March 31, 1950, Serial No. 153,279

13 Claims. (Cl. 73—88)

This invention relates to devices for measuring the stresses in model structures such as the cables of suspension bridges the reaction points of trusses, bridges, girders, beams or the like and the members of trusses or other structures.

The invention contemplates the provision of means for measuring the tensile and compressive forces in members or at reaction points through the amount of the bowing of flat springs placed in the circuit of such forces.

The invention further contemplates the provision of a simple and inexpensive stressometer, designed for insertion into or between the ends of a stressed member, or between the end of a structure and a support when reactions are to be measured, or to replace such member as part of a stressed structure for directly indicating the stress in the member or the amount of the reaction when the structure is loaded.

The invention further contemplates the provision of a compact and efficient stressometer comprising a sheet spring unit mounted in such a manner that twisting thereof is avoided, and of simple means for indicating the stress in a structural member which is transmitted to the unit and causes deflection of the unit, said means being operated by such deflection.

The invention further contemplates the provision of a spring unit adapted to deflect in the manner of a simple beam relatively to fixed end supports and thereby transmitting the deflections thereof under stress to an indicating needle moving proportionally to the stress over a dial calibrated in equal divisions.

The various objects of the invention will be clear from the description which follows and from the drawings, in which Fig. 1 is a fragmentary top plan view partly broken away of part of a typical model truss and of load applying means therefor, showing the stressometer substituted for an end part of a lower chord member.

Fig. 4 is a top plan view of a modified form of the stress applying means showing the stressometer substituted for a middle part of an end member of a truss.

Fig. 5 is a vertical sectional view of a sectional member adapted to have part thereof replaced by the stressometer, taken on the line 5—5 of Fig. 4.

Fig. 6 is a top plan view of the stressometer partly broken away and showing one form of the deflecting spring unit.

Fig. 7 is a vertical sectional view thereof taken on the line 7—7 of Fig. 6.

Fig. 8 is a vertical sectional view thereof taken on the line 8—8 of Fig. 7.

Fig. 9 is a perspective view of a modified form of the spring unit reduced to a minimum thickness at its hinge points to insure that the amount of deflection would be proportional to the load.

Fig. 10 is a similar view of another modified form of the spring unit of the type acting similarly to a simple beam.

Fig. 11 is a diagrammatical view of a laminated spring unit tending to act as a simple beam, and of a modified form of the indicating device or strain gage associated therewith.

Figure 1:
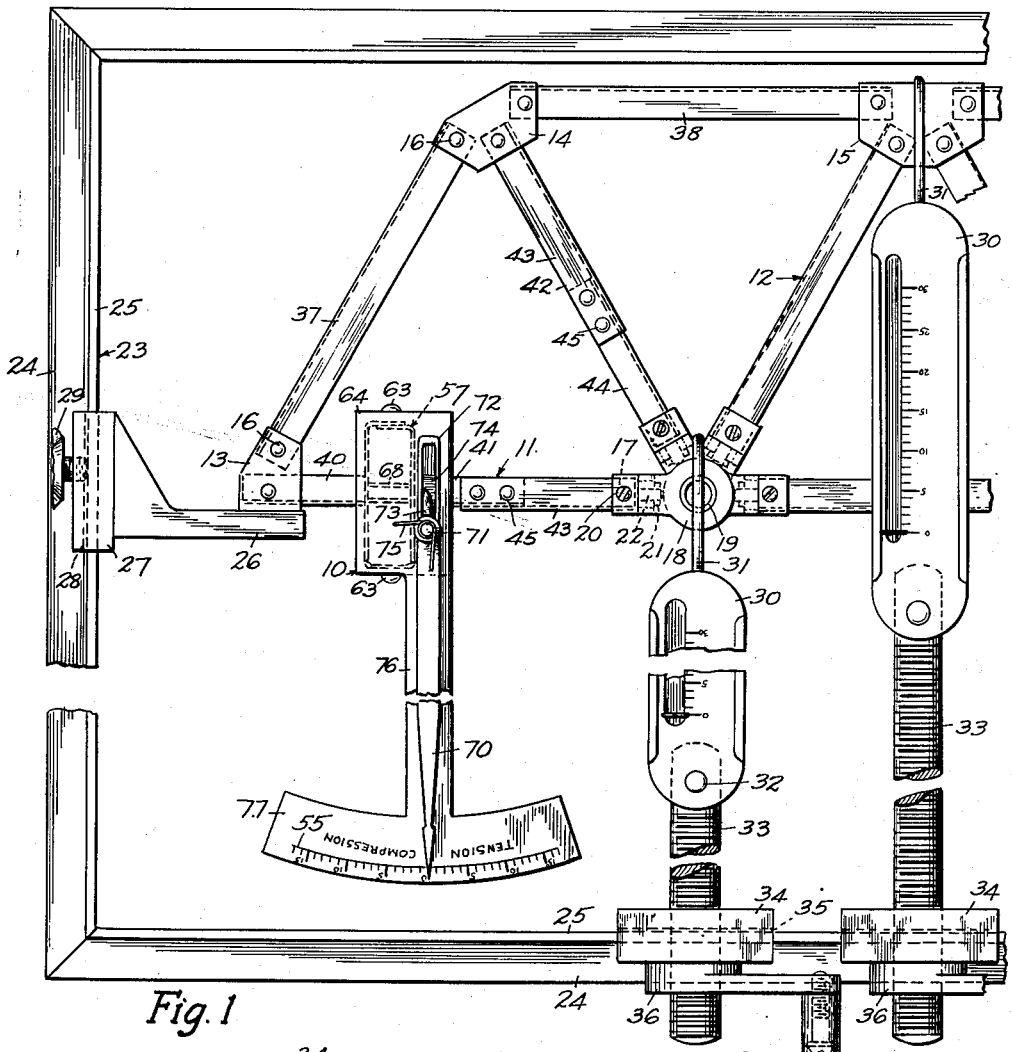
Figure 3:
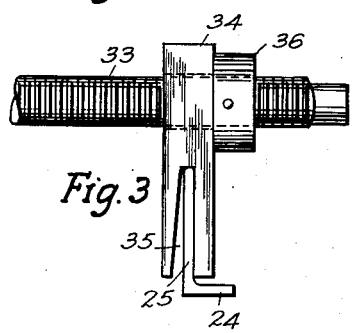
Fig. 3 is a side elevational view of Fig. 2.
Figure 2:
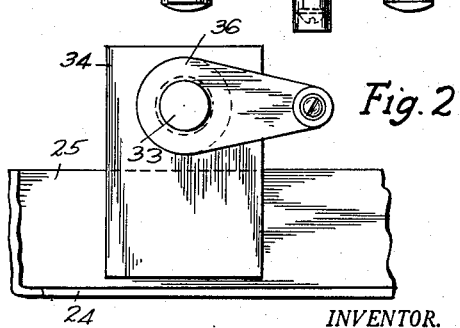
Fig. 2 is a fragmentary front elevational view of the retaining means for one of the quickly detachable and quickly replaceable loading units.

In the practical embodiment of the invention shown by way of example, and referring particularly to Figs. 1 to 3, the stressometer 10 illustrated is in an operative position in the lower chord member 11 of the truss 12, the stressometer and its connections replacing the left hand part of said member 11. The members of the truss are illustrated as channels, but it will be understood that they may be of any of the cross sectional shapes customarily used for the purpose and so well known as to require no illustration. For quick removal and replacement, the ends of the truss members may be held to the gussets 13, 14 and 15 by the headed removable pins 16, similar to the pin 51 of Fig. 5, at the truss joints where gussets or gusset plates are employed. Or where a pinned joint is to be investigated, the end of each of the various members is clamped in a vise diagrammatically shown at 17, the vise being suitably supported between a pair of laterally spaced apart plates as 18 for lateral adjustment, the plates being pivoted on the joint pin or tube 19. The screw 20, operates the vise to clamp and to release the member, while the nut 21 on the laterally adjustable screw 22 projecting from the vise serves to tighten the clamped member together with the vise in any desired laterally adjusted position, that is, a position adjusted in a direction parallel to the joint pin 19.

The statically determinate truss or other model or toy structure 12 is arranged within the frame 23 which is preferably formed of four angles such as 24 suitably secured together and each having an upstanding leg 25. The ends or reaction points of the truss are each supported by an adjustable support arm 26 projecting transversely from a slide 27 having a groove 28 therethrough and carrying a clamping screw 29. To position the slide 27, it is mounted on the upright leg 25 of one of the side angles of the frame, said leg entering the groove 28, and the slide is moved vertically, as viewed in Fig. 1, until the arm 26 is in contact with the extreme left end portion of the truss, after which the screw 29 is tightened. A similar slide is similarly brought into position to support the other end of the truss. For applying the simulated load to the truss as at the panel points of other joints, a spring balance, weights, or any other type of force applying means for a measurable force, is employed. In the form shown, said means comprises the spring balance 30 having a suitable indicator-operating hook 31 at one end thereof and pinned at the other end thereof, as by the pin 32 to the end part of a non-rotatable screw 33. After the hook 31 is hooked about the truss at the selected joint, load is applied to the truss by pulling on the screw 33.

For this purpose, the screw passes loosely through the grooved load retainer 34 having the transverse groove 35 therethrough and adapted to be mounted on the front one or any one of the angles 24 with the upright leg 25 thereof inserted into the groove as best seen in Fig. 3. A stop nut or crank 36 in threaded engagement with the screw 33 serves to control the position of the retainer 34 on the screw, the crank being adapted for rapid rotation to move it along the non-rotatable screw to the desired position to put the required pull on the spring balance and its hook and therethrough on the truss joint. Obviously, the load may be quickly released merely by lifting the retainer 34 off the angle leg 25, and may as quickly be reapplied by pulling on the screw enough to permit the retainer to become aligned with and mounted on the frame angle. As many spring balances and cranks as desired may be employed on the truss in the manner indicated in Fig. 1, to apply loads at all the required points in simulation of the loading of a full size structure. Furthermore, a spring may be introduced into each of as many of the members as is desired, the load applied and the stresses in any selected number or all of the members determined simultaneously. To determine the reaction force, the slide 27 is merely clamped far enough down on the side angle 24 to permit the stressometer 10 to be inserted between the arm 26 and the end of the truss in an obvious manner.

In the case of a one-piece member such as the end member 37 or the upper chord member 38, removal of the pins 16 permits removal of the entire member. Before removal of any member, the stress therein may be transferred, if the structure remains loaded, to a spanner or load-assuming device bridging the gap between the end joints until the stressometer is inserted therebetween. Or, as above indicated, the loads may be released before the stressometer is introduced by merely lifting the retainers 34 off the angle frame. The extensions 40 and 41 projecting from the stressometer are so shaped that they may be secured by the same pins 16 to the respective end joints of the removed member, being long enough for that purpose.

As shown in Figs. 1 and 4, the truss member, instead of being continuous, may be made in two or more sections so designed that only one section need be removed when the stressometer is to be inserted into place. In Fig. 1, the web member 42 of the truss is shown as made up of a main channel 43 and a telescoping smaller channel 44, the channels being secured together as by means of the intermediate pins 45 similar to the pins 16. (See also Fig. 5.) The lower chord member 11 is shown to be of the same construction as the web member 42, but the smaller channel 44 which would be at the left of said member 11 as viewed in Fig. 1 has been removed and replaced by the extensions 40 and 41 of the stressometer, the extension 41 being telescoped into the main channel 43 and secured thereto by the pins 45.

In Fig. 4, the lower chord member 46 of the truss 47 is made of three sections, two of the sections being the end or main sections 48 and 49 and the other being the smaller intermediate section 50 which is telescoped at its ends into the other two sections and removably secured thereto as by the pins 51. The stressometer is inserted into place by removing the middle section 50 and replacing it by the respective extensions 40 entering the main channel section 48, and 41 entering the other section 49 of the main channel. Such arrangement is seen at the end member 52 of the truss of Fig. 4.

As shown in Figs. 1 and 6 to 8, the stressometer 10 comprises a spring unit having a pair of spring portions of flat or sheet material tied together at the corresponding ends thereof to prevent twisting and additionally tied together at approximately the mid-points thereof to deflect together as a single unit in either direction on the application of load through the extensions 40 and 41 to the mid-points of the spring portions. The stressometer is completed by suitable means for measuring and indicating the amount of deflection in terms of the load necessary to cause the deflection and hence indicating the stress in the member being investigated. The spring units may take any one of a number of different forms. Where variable spacing on the scale as at 53, Fig. 4, is unobjectionable, the relatively inexpensive and sturdy spring 54 shown in Figs. 6, 7 and 8 is used. Where, however, the scale divisions are required to be equal as on the scales 55 of Fig. 1 and 56 of Fig. 11, the spring unit should act quite similarly to the action of a simple beam and therefore requires a definite hinge point at each end thereof reducing the resistance at said end to a minimum. The spring unit 57 of Figs. 1 and 9, the unit 58 of Fig. 10 and the unit 59 of Fig. 11 are designed to act as described, and will be explained in detail hereinafter.

Referring now to Figs. 6 to 8, the spring unit 54 of the stressometer is preferably made of a single strip of sheet metal of uniform width having two similar parallel spaced apart deflecting or spring portions 60, 61 joined by the integral connecting and perpendicular part 62 at one end secured to the casing 64 as by a bolt 63. The other corresponding ends of the spring portions are overlapped and fastened together as by a similar bolt 63 passing through the casing which substantially encloses the spring unit. A preferably square hole as 65 is made at about the mid-points of the portions 60 and 61 for the passage therethrough of the square spacer 66 projecting from the extension 40 whereby said extension is maintained against rotation relatively to the spring unit and to the casing. A reduced screw threaded end portion 69 of the spacer projects beyond the spring portion 61 and carries the nut 67 which serves to maintain the spring portions in their proper spaced relation, aided by the tubular spacing post 68 surrounding the square spacer 66, regardless of whether the spring portions are pressed together under compression or pulled apart under tension. The casing 64 therefore supports the spring unit in such a manner that twisting of the unit under stresses thereon is avoided and the extension 40 is free to move toward and away from the other extension 41 to deflect the mid-portion of the unit downwardly as viewed in Fig. 6 or upwardly, the extension 41 being fixed to the casing in any suitable manner.

Any suitable means is provided for the measuring and indicating the amount of the deflection and the direction of deflection. Said means includes a scale calibrated to indicate the direction and amount of force exerted on the particular spring unit in the stressometer. In the form shown in Figs. 6 to 8, said means comprises the needle 70 pivotally mounted on the shaft 71 which has its bearings in the casing 64 and is arranged beyond the spring unit 54. From the shorter portion 72 of the needle is cut an integral tongue 73 bent through the slot 74 of the casing and shown as twisted to engage the end of the screw portion 69, being held in pressed contact with said portion 69 by means of the coil spring 75. Said spring is arranged around the shaft 71 and has one end fixed to the needle and the other end anchored to the casing. An arm 76 fixed to the casing carries the segment 77 on which is mounted a suitable scale.

In the forms of the spring unit shown in Figs. 1, 9, 10 and 11, hinge points are provided about which the parallel spring portions may flex without twisting in order that the deflection may be proportional to the load on the unit. As best seen in Fig. 9, the spring unit 57 comprises the similar parallel spaced spring portions 80, 81 substantially reduced in width and thickness at the ends thereof as at 82, 83 of each portion whereby the area of material at each of said ends is so small that the resistance to flexing is reduced to a minimum at said ends as in a simple beam. However, in practice, the connecting portion 84 is provided for the ends 82 and the other end parts of the spring portion material are overlapped at 84a with the bolts 63 securing the overlapped parts of the unit to the casing and also securing the connecting portion 84 to the casing in the manner in which the spring 54 is secured. The portions 80 and 81 are therefore adequately braced against twisting, and the span of the simple beam portion is from the point 82 to the point 83.

In the form of the unit 58 shown in Fig. 10, the flat parallel spring portions 85, 86 are tied together at the end parts thereof by the bolts or rivets 87 passing through the spacers 88. Each of the spring portions is thinned considerably along hinge lines adjacent the inner faces of said spacers as by means of the transverse grooves 89 therein, whereby the portions 85, 86 are compelled to deflect as a unit about said hinge lines. The round holes 90 at the mid-points of the spring portions may be used, if desired, for the passage of a cylindrical spacer on the extension 40 instead of the square spacer shown.

As shown in Fig. 11, the grooves 89 may be dispensed with by the provision of a pair of similar spaced laminated or leaf springs each having a relatively thin leaf 91 resting on the end spacers 88 and a thicker leaf 92 of the proper span resting on the thin leaf. The thin leaf offers little resistance to flexing. All of the leaves are tied together by the center post 93 projecting from the thicker leaf 92 passing through holes in the thinner leaves and having a reduced threaded part passing through a hole in the other parallel spaced thick leaf 94. The nut 95 cooperates with the tubular spacer 96 around the post 93 to tie the springs together for deflection in both directions as a unit. The dash-dot lines for the spring portion 94 show how the unit deflects under compression as in the direction of the arrow.

In Fig. 11 is also shown a modified form of the indicating device, which as illustrated consists of a suitably calibrated dial over which swings a needle 97 mounted on a shaft 98 which carries the small pinion 99. For operating the pinion and the needle, a rack 100 is meshed with the pinion and reciprocates longitudinally in response to the movement of the rack extension 101. A suitable coil spring on the shaft 98 similar to the spring 75 normally maintains the extension 101 in contact with the end of the post 93 and holds the needle in zero position when no measurable force is exerted on the spring unit 59 or the like unit. The casing for the dial is suitably secured to the end spacers 88 and thereby supports the spring unit 59. The casing carries one extension 41, the other extension 40 being secured to the thicker spring 92, whereby the instrument may be quickly inserted into place in a structure as hereinbefore explained in connection with Figs. 1 and 6.

Where an inexpensive mounting for the test truss is required, as in structural toy sets or the like shown in Fig. 4, the truss 47 lies on the base 102 with the ends of the truss resting on the reaction blocks 103 fixed to the base. The hook 31 of the spring balance 30 is hooked to the joint to be loaded and the wing nut 104 tightened to pull on the bolt 105 and on the bolt holder 106 fixed to the spring balance and holding the bolt against rotation. The end part of the bolt passes through the slot 107 in the upstanding flange or leg 108 of the angle bracket 109, the other leg of which is secured to the base. To release the load, the wing nut is lifted to remove the bolt from the slot 107. Reinserting the bolt into the slot without turning the nut reapplies the load.

It will now be understood that I have provided an instrument for adequately determining by direct measurement the forces in each or in any number simultaneously of the members of a statically determinate loaded model or toy structure, that said instrument while simple and easily inserted into and removed from the structure, is efficient and well designed to meet practical requirements, and that the measurement of the stress directly as a function of the deflection of a spring introduced into and remaining as at least part of a loaded structure during the measurement is an effective, accurate and dependable mode of determining the stress.

Various forms of the invention have herein been shown and described, but other changes may obviously be made therein without departing from the spirit of the invention defined in the appended claims.

I claim:

1. A stress determining instrument comprising a spring unit having a pair of similar parallel spaced apart flat portions each having a central opening therein and being otherwise imperforate, a spacer having a shoulder thereon secured to and between the spring portions at the midpoints thereof and tying the mid-points together for deflection as a unit in either direction, means supporting the ends only of the spring portions and holding said ends against twisting under forces applied perpendicularly to and toward and away from said flat portions, the edges of the portions being free to move under said forces, and means calibrated to correspond to and responsive to the deflection of the spring portions for indicating the deflecting force upon the spring unit.

2. The instrument of claim 1, a first extension from the spacer adapted for connection to one point of a structure and secured to and extending in one direction from the mid-point of one of the spring portions and transferring the stress in the structure to the spring unit and a second extension arranged coaxially with the first extension and adapted for connection to a different point of the structure and extending in the opposite direction from and secured to the spring supporting means, the first extension having a shoulder thereon engaging the outer flat surface of one of the spring portions, a threaded portion of lesser diameter than that of the spacer projecting from the end of the spacer and passing through the other spring portion and a nut on the threaded portion.

3. The instrument of claim 2, the spring supporting means comprising a casing, the deflection responsive means including an indicating needle pivoted to the casing, a scale for the needle, a movable member having an operative connection to the needle and a spring pressing the movable member against the spring unit at said midpoint, the supporting means connecting the corresponding end parts of the spring portions to each other.

4. In a stress determining instrument insertable in a structural member to replace part of said member, a spring unit comprising a pair of laterally spaced apart flat and generally rectangular spring portions each of sheet material, means securing the mid-points of said portions together, a casing supporting the ends only of the unit, the side edges of the unit being movable relatively to the casing, an indicator in the path of the securing means, and means actuated by movement of the securing means for actuating the indicator.

5. The instrument of claim 4, a first elongated extension secured to and extending from the casing and shaped to fit and securable to one remaining part of the structural member and a second elongated extension aligned with the first extension and secured to the spring unit and securable to the other remaining part of the structural member.

6. In a stress determining instrument insertable in a structural member to replace part of said member, a spring unit comprising a pair of laterally spaced apart flat and generally rectangular spring portions each of sheet material, means securing the mid-points of said portions together, a casing supporting the ends only of the unit, the side edges of the unit being movable relatively to the casing, and an indicator in the path of and responsive to movement of the securing means, the spring unit comprising a single piece of material having an integral connecting portion joining the ends of the spring portions, the ends of said piece being overlapped, a fastener passing through the overlapped ends and through the casing, and a fastener passing through the connecting portion and the casing.

7. The instrument of claim 6, each of the end parts of the spring portions being reduced in thickness and providing a hinge line about which the spring portions deflect on the application of force to the spring unit.

8. The instrument of claim 6, each of the end parts of the spring portions being reduced in width and in thickness and thereby substantially reducing the resistance of the spring portion to bending at said reduced end parts.

9. In a stress determining instrument, a spring unit comprising a pair of laterally spaced apart flat and generally rectangular spring portions each of sheet material, means securing the midpoints of said portions together, a casing supporting the ends only of the unit, the side edges of the unit being movable relatively to the casing, and an indicator responsive to movement of the securing means, each of said spring portions comprising a laminated spring including a flat relatively thin spring and a shorter and thicker flat spring on the thin spring.

10. The instrument of claim 9, the ends of the thicker spring being unsecured.

11. In a stress determining instrument, a spring unit comprising a pair of laterally spaced apart flat and generally rectangular spring portions each of sheet material, means securing the mid-points of said portions together, a casing supporting the ends only of the unit, the side edges of the unit being movable relatively to the casing, and an indicator responsive to movement of the securing means, each of the spring portions having a transverse groove part way through the thickness of each of the end parts thereof, said grooves determining the effective span of each of the spring portions.

12. In a stress determining instrument adapted for insertion into a statically determinate test structure provided with a series of members removably secured together at the ends thereof and adapted to be loaded, a spring unit comprising a pair of generally rectangular parallel spaced apart laterally deflectable spring portions each having side edges between the ends thereof, said portions being imperforate except at the centers thereof, means supporting only the ends of said portions including a casing for the unit, the side edges of said portions being unsecured and movable relatively to the casing, a central spacing post between the portions and deflectable therewith, means securing the post to the portions, and indicating means responsive to movement of the post.

13. A stress determining instrument comprising a pair of laterally spaced apart flat and normally parallel spring portions of sheet material, each being imperforate at the area between the peripheral edge thereof and the central part thereof, a first securing means at said central part tying the mid-points of said portions together, a second securing means tying two oppositely located peripheral edge parts of one of said portions to corresponding parts of the other portion against twisting movement, the remaining parts of the peripheral edges of the spring portions being unsecured and being movable with the first securing means relatively to the second securing means and relatively to the tied-together edge parts of said portions, and an indicator responsive to movement of the first securing means to indicate such movement.

MORRIS BERMAN.

References Cited in the file of this patent

UNITED STATES PATENTS

| Number | Name | Date |
|---|---|---|
| 361,689 | Giddings | Apr. 26, 1897 |
| 958,172 | Puffenberger | May 17, 1910 |
| 1,696,148 | Camp | Dec. 18, 1928 |
| 1,770,907 | Berman | June 22, 1930 |

FOREIGN PATENTS

| Number | Country | Date |
|---|---|---|
| 4,602 | Great Britain | 1907 |
| 448,300 | Great Britain | June 5, 1936 |

OTHER REFERENCES

Engineering News Record, vol. 108, March 17, 1932, p. 389.